United States Patent
Gobara

(10) Patent No.: US 7,423,584 B2
(45) Date of Patent: Sep. 9, 2008

(54) TERMINAL DEVICE, METHOD OF CONTROLLING TERMINAL DEVICE, AND RECORDING MEDIUM

(75) Inventor: Naoki Gobara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/839,605

(22) Filed: Aug. 16, 2007

(65) Prior Publication Data

US 2008/0062040 A1    Mar. 13, 2008

(30) Foreign Application Priority Data

Sep. 7, 2006    (JP)    ............... 2006-242421

(51) Int. Cl.
*G01S 1/00* (2006.01)
*H04B 7/185* (2006.01)

(52) U.S. Cl. ............... 342/357.15

(58) Field of Classification Search ............ 342/357.15, 342/357.12

See application file for complete search history.

(56) References Cited

U.S. PATENT DOCUMENTS

2002/0093452 A1* 7/2002 Hirata et al. ........... 342/357.12
2006/0044184 A1* 3/2006 Kimura ................. 342/357.15
2007/0035344 A1* 2/2007 Kobayashi ................. 331/70
2008/0068258 A1* 3/2008 Maezawa et al. ....... 342/357.03

FOREIGN PATENT DOCUMENTS

JP    H05-256926 A    10/1993

* cited by examiner

*Primary Examiner*—Thomas H. Tarcza
*Assistant Examiner*—Fred H. Mull
(74) *Attorney, Agent, or Firm*—Global IP Counselors, LLP

(57) ABSTRACT

A terminal device searches for a satellite signal by performing a correlation process over a predetermined first accumulation time within a predetermined frequency range in units of search frequencies at specific intervals. When the terminal device has failed in searching for the satellite signal, the terminal device searches for the satellite signal by performing the correlation process over a predetermined second accumulation time longer than the first accumulation time at the search frequency and frequencies differing from the search frequency by a specific frequency which is less than the interval of the search frequencies and specified based on a drift of a reference oscillator of the terminal device within the second accumulation time. The terminal device determines a search result of the satellite signal based on a search result at the search frequency and search results at the frequencies differing from the search frequency by the specific frequency.

5 Claims, 11 Drawing Sheets

PHASE WIDTH W1 = 1/32ND OF CHIP
SAMPLING PHASE SC1 = PHASE AT INTERVALS OF PHASE WIDTH W1

CHANGES FREQUENCY AT INTERVALS OF 20 Hz WITHIN
RANGE OF SEARCH CENTER FREQUENCY A ± 100 kHz

EXPRESSION 1 : SEARCH CENTER FREQUENCY A =
TRANSMISSION FREQUENCY H1 +
ESTIMATED DOPPLER SHIFT H2 + DRIFT DR

| | COHERENT TIME (ms) | ACCUMULATION TIME (s) | FIELD INTENSITY (dBm) |
|---|---|---|---|
| SEARCH MODE M1 | 5 | 1 | −150 OR MORE |
| SEARCH MODE M2 | 5 | 16 | −160 OR MORE AND LESS THAN −150 |
| SEARCH MODE M3 | 5 | 120 | −166 OR MORE AND LESS THAN −160 |

EXPRESSION 2: Pmax1f=H+Ha+Hb

EXPRESSION 3: CP1f=(CP1+CP1a+CP1b)/3

US 7,423,584 B2

TERMINAL DEVICE, METHOD OF CONTROLLING TERMINAL DEVICE, AND RECORDING MEDIUM

Japanese Patent Application No. 2006-242421 filed on Sep. 7, 2006, is hereby incorporated by reference in its entirety.

BACKGROUND OF THE INVENTION

The present invention relates to a terminal device, a method of controlling a terminal device, and a computer-readable recording medium storing a program.

A positioning system has been used in practice which locates the present position of a GPS receiver (hereinafter called "receiver") utilizing a satellite positioning system (SPS) using a position information satellite such as a global positioning system (GPS).

The receiver estimates the frequency of a signal received from a GPS satellite (hereinafter may be simply called "satellite") based on GPS satellite orbital information stored in advance and the like, and achieves synchronization with the estimated frequency (hereinafter called "estimated frequency") to receive the signal from the satellite (hereinafter called "satellite signal"). The receiver achieves synchronization after down-converting the frequency of the satellite signal received through an antenna using a clock signal generated by a local oscillator provided in the receiver.

However, since the local oscillator of the receiver changes in frequency due to a change in temperature (hereinafter called "drift"), the frequency after down conversion (hereinafter called "actual reception frequency") differs from the estimated frequency if no measures are taken, thereby making it impossible to promptly achieve synchronization.

In order to solve this problem, technology has been proposed in which the receiver stores information indicating the difference in frequency of the receiver during the preceding positioning, and achieves synchronization based on the information indicating the difference in frequency during the preceding positioning when subsequently receiving the signal from the satellite (e.g. JP-A-5-256926 (e.g. FIG. 1)).

The receiver correlates a coarse/acquisition (C/A) code contained in the satellite signal with a C/A code replica held by the receiver in order to receive the satellite signal.

In the correlation process, the receiver performs a coherent process and an incoherent (accumulation) process.

The receiver performs the correlation process at specific frequency steps within a specific frequency band around the estimated frequency (frequency at each frequency step is hereinafter called "search frequency").

The receiver fixes the search frequency of the receiver within the accumulation time. However, the drift also occurs within the accumulation time.

Therefore, the frequency may differ from the actual reception frequency due to the drift within the accumulation time, whereby synchronization with the satellite signal may not be achieved.

In particular, since it is difficult to distinguish the satellite signal from noise under a weak electric field (e.g. indoors) in which the field intensity of the satellite signal is weak, it is necessary to increase the accumulation time (incoherent time) of the correlation process in order to receive the satellite signal while distinguishing the satellite signal from noise.

However, since the drift increases along with an increase in the accumulation time, the actual reception frequency differs from the search frequency to a large extent, whereby the satellite signal cannot be efficiently received.

SUMMARY

According to one aspect of the invention, there is provided a terminal device which locates a position using a satellite signal from a satellite positioning system (SPS) satellite, the terminal device comprising:

a signal search section which can search for the satellite signal in a basic mode, in which the signal search section searches for the satellite signal by performing a correlation process over a predetermined first accumulation time within a predetermined frequency range in units of search frequencies at specific intervals, and a special mode, in which the signal search section searches for the satellite signal by performing the correlation process over a predetermined second accumulation time longer than the first accumulation time, the signal search section searching for the satellite signal in the special mode at the search frequency and frequencies differing from the search frequency by a specific frequency which is less than the interval of the search frequencies and specified based on a drift of a reference oscillator of the terminal device within the second accumulation time, and determining a search result in the special mode based on search results at the search frequency and the frequencies differing from the search frequency by the specific frequency.

BRIEF DESCRIPTION OF THE SEVERAL VIEWS OF THE DRAWING

FIG. 7 is a view illustrative of search modes M1 and the like.

FIG. 8 is a view illustrative of the search mode M1.

DETAILED DESCRIPTION OF THE EMBODIMENT

Figure 1:
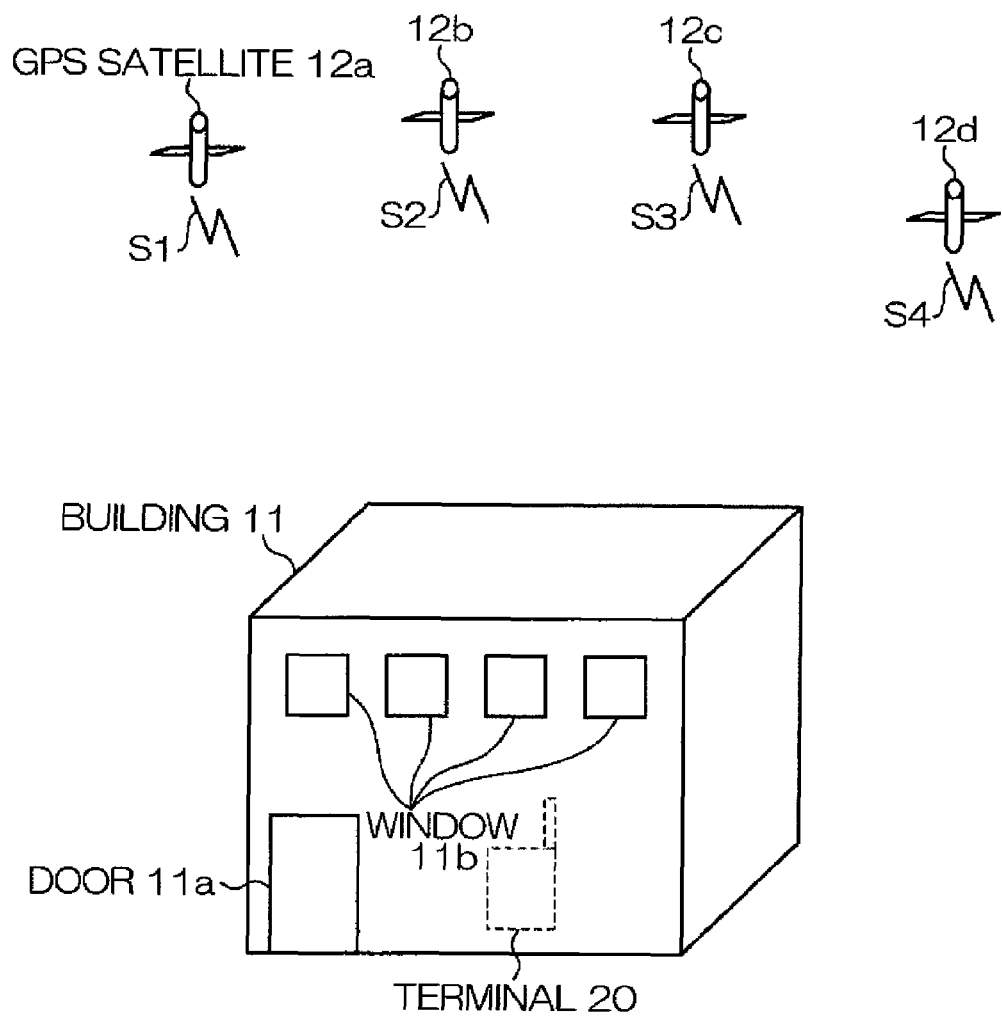
FIG. 1 is a schematic view showing a terminal and the like according to one embodiment of the invention.

The invention may provide a terminal device which achieves synchronization with a satellite signal, even if the actual reception frequency differs from a search frequency, under a weak electric field which requires an increased accumulation time.

According to one embodiment of the invention, there is provided a terminal device which locates a position using a satellite signal from a satellite positioning system (SPS) satellite, the terminal device comprising:

a signal search section which can search for the satellite signal in a basic mode, in which the signal search section searches for the satellite signal by performing a correlation process over a predetermined first accumulation time within a predetermined frequency range in units of search frequencies at specific intervals, and a special mode, in which the signal search section searches for the satellite signal by performing the correlation process over a predetermined second accumulation time longer than the first accumulation time, the signal search section searching for the satellite signal in the special mode at the search frequency and frequencies differing from the search frequency by a specific frequency which is less than the interval of the search frequencies and specified based on a drift of a reference oscillator of the terminal device within the second accumulation time, and determining a search result in the special mode based on search results at the search frequency and the frequencies differing from the search frequency by the specific frequency.

This enables the terminal device to search for the satellite signal in the special mode. Since the second accumulation time in the special mode is longer than the first accumulation time, the special mode is suitable for a weak electric field.

In the special mode, the terminal device searches for the satellite signal at the frequencies differing from the search frequency by the specific frequency in addition to the search frequency. The specific frequency is specified based on the drift of the reference oscillator of the terminal device within the second accumulation time.

Specifically, the frequencies for searching for the satellite signal in the special mode are specified taking the drift into consideration. Therefore, even if the drift occurs in the terminal device, appropriate correlation results (accumulation results) can be obtained at the search frequency and the frequencies differing from the search frequency by the specific frequency.

In the special mode, the terminal device sums up the accumulation results at the search frequency and the frequencies differing from the search frequency by the specific frequency. This enables the terminal device to distinguish the satellite signal from noise even under a weak electric field.

This enables synchronization with the satellite signal, even if the actual reception frequency differs from the search frequency, under a weak electric field which requires an increased accumulation time.

In the terminal device, in the special mode, the signal search section may search for the satellite signal at a frequency higher than the search frequency by the specific frequency and a frequency lower than the search frequency by the specific frequency as the frequencies differing from the search frequency by the specific frequency.

This enables efficient reception of the satellite signal, even if the actual reception frequency becomes higher or lower due to the drift, under a weak electric field which requires an increased accumulation time.

In the terminal device, the specific frequency may be specified based on a maximum value of the drift of the reference oscillator within the second accumulation time.

This enables reliable and efficient reception of the satellite signal under a weak electric field which requires an increased accumulation time.

According to another embodiment of the invention, there is provided a method of controlling a terminal device which locates a position using a satellite signal from a satellite positioning system (SPS) satellite, the method comprising:

searching for the satellite signal by performing a correlation process over a predetermined first accumulation time within a predetermined frequency range in units of search frequencies at specific intervals;

searching for the satellite signal, when the search for the satellite signal has failed, by performing the correlation process over a predetermined second accumulation time longer than the first accumulation time at the search frequency and frequencies differing from the search frequency by a specific frequency which is less than the interval of the search frequencies and specified based on a drift of a reference oscillator of the terminal device within the second accumulation time; and determining a search result of the satellite signal based on a search result at the search frequency and search results at the frequencies differing from the search frequency by the specific frequency.

This enables synchronization with the satellite signal, even if the actual reception frequency differs from the search frequency, under a weak electric field which requires an increased accumulation time.

According to a further embodiment of the invention, there is provided a computer-readable recording medium storing a program for causing a computer provided in a terminal device, which locates a position using a satellite signal from a satellite positioning system (SPS) satellite, to execute:

a process of searching for the satellite signal by performing a correlation process over a predetermined first accumulation time within a predetermined frequency range in units of search frequencies at specific intervals;

a process of searching for the satellite signal, when the search for the satellite signal has failed, by performing the correlation process over a predetermined second accumulation time longer than the first accumulation time at the search frequency and frequencies differing from the search frequency by a specific frequency which is less than the interval of the search frequencies and specified based on a drift of a reference oscillator of the terminal device within the second accumulation time; and a process of determining a search result of the satellite signal based on a search result at the search frequency and search results at the frequencies differing from the search frequency by the specific frequency.

Preferred embodiments of the invention are described below in detail with reference to the drawings.

The following embodiments illustrate specific preferred embodiments of the invention and are provided with various technologically preferred limitations. Note that the scope of the invention is not limited to the following embodiments unless otherwise indicated.

FIG. 1 is a schematic view showing a terminal 20 and the like according to one embodiment of the invention.

As shown in FIG. 1, the terminal 20 receives signals S1, S2, S3, and S4 from GPS satellites (SPS satellites) 12a, 12b, 12c, and 12d, for example. The terminal 20 locates the present position using the signals S1 and the like. The terminal 20 exemplifies a terminal device.

As shown in FIG. 1, the terminal 20 is located in a building 11. The terminal 20 is located apart from a door 11a and windows 11b of the building 11. Therefore, the field intensities of the signals S1 and the like are extremely weak (i.e., very weak electric field) at the position of the terminal 20. The term "very weak electric field" refers to a signal strength of −166 dBm or more and less than −160 dBm, for example.

The terminal 20 is configured as described below so that the terminal 20 can receive the signals S1 and the like even under a very weak electric field.

The terminal 20 is a portable telephone, for example. The terminal 20 may also be a personal handy-phone system (PHS), a personal digital assistance (PDA), or the like.

(Main Hardware Configuration of Terminal 20)

Figure 2:
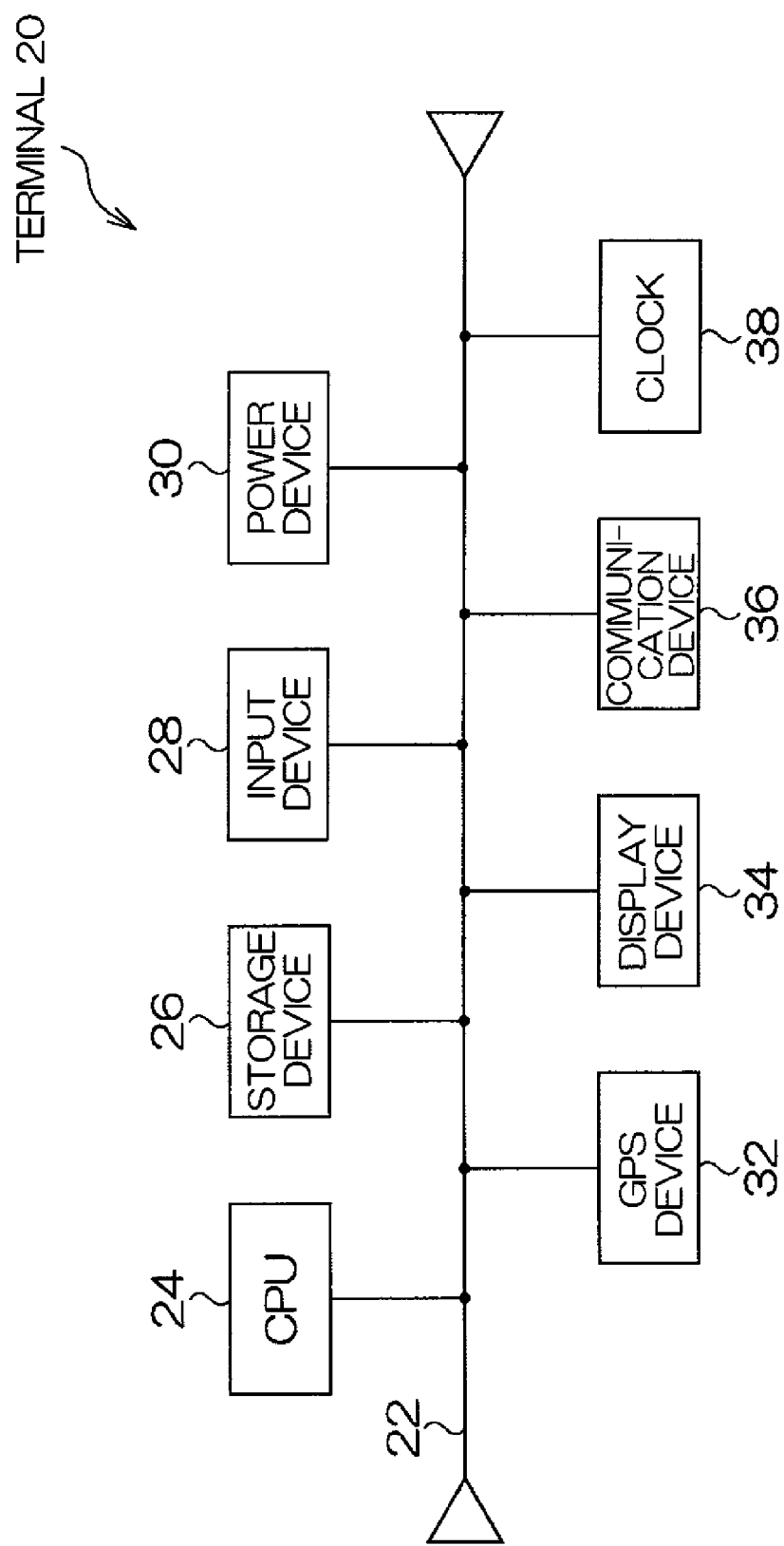
FIG. 2 is a schematic view showing the main hardware configuration of the terminal.

FIG. 2 is a schematic view showing the main hardware configuration of the terminal 20.

As shown in FIG. 2, the terminal 20 includes a computer which includes a bus 22, for example. A central processing unit (CPU) 24, a storage device 26, and the like are connected with the bus 22. The CPU 24 is a control section which performs a process of a specific program and controls the storage device 26 and the like connected with the bus 22. The storage device 26 is a random access memory (RAM), a read only memory (ROM), or the like.

A GPS device 32 for receiving the signals S1 and the like, a display device 34 for displaying various types of information, and a communication device 36 for communicating with another terminal or the like through a base station and a communication network (not shown) are also connected with the bus 22.

A clock 38 is also connected with the bus 22.

The terminal 20 includes an oscillator (e.g. crystal oscillator (not shown)) which generates a reference clock signal for the CPU 24 and the like to operate.

The crystal oscillator undergoes a drift. The term "drift" refers to a change in frequency due to a change in temperature. The drift properties can be measured when manufacturing the terminal 20.

The GPS device 32 receives the signals S1 and the like, as described above. The GPS device 32 searches for the signals S1 and the like, and tracks the signals S1 and the like when succeeding in searching for the signals S1 and the like. In this specification, the expression "succeeds in searching for the signal" is used synonymously with the expression "receives the signal".

(Main Software Configuration of Terminal 20)

Figure 3:
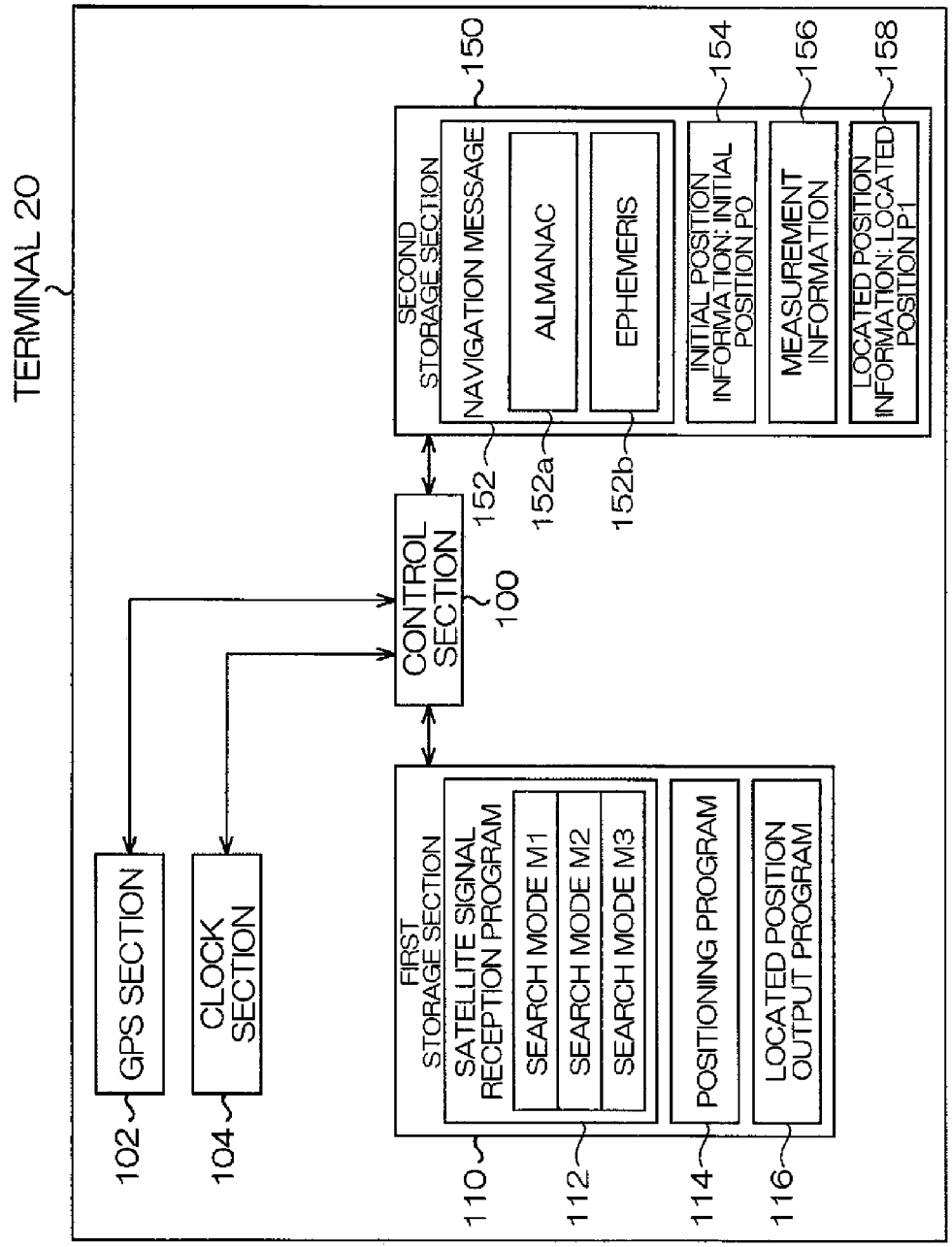
FIG. 3 is a schematic view showing the main software configuration and the like of the terminal.

FIG. 3 is a schematic view showing the main software configuration of the terminal 20.

As shown in FIG. 3, the terminal 20 includes a control section 100 which controls each section, a GPS section 102 corresponding to the GPS device 32 shown in FIG. 2, a clock section 104 corresponding to the clock 38, and the like.

The terminal 20 also includes a first storage section 110 which stores various programs, and the second storage section 150 which stores various types of information.

As shown in FIG. 3, the terminal 20 stores a navigation message 152 in the second storage section 150. The navigation message 152 includes an almanac 152a indicating the approximate orbits of all of the GPS satellites 12a and the like, and an ephemeris 152b indicating the precise orbit of each of the GPS satellites 12a and the like. The terminal 20 acquires the almanac 152a and the ephemeris 152b by receiving and decoding the signals S1 and the like from the GPS satellites 12a and the like.

The terminal 20 uses the navigation message 152 for positioning based on the signals S1 and the like.

As shown in FIG. 3, the terminal 20 stores initial position information 154 in the second storage section 150. The initial position information 154 is information indicating an initial position P0. The initial position P0 is the position located during the preceding positioning, for example.

The terminal 20 uses the initial position P0 for calculating the observable GPS satellites 12a and the like, for example.

As shown in FIG. 3, the terminal 20 stores a satellite signal reception program 112 in the first storage section 110. The satellite signal reception program 112 is a program for causing the control section 100 to receive the signals S1 and the like from the GPS satellites 12a and the like.

In more detail, the control section 100 refers to the almanac 152a and determines the GPS satellites 12a and the like which can be observed at the present time measured by the clock section 104. In this case, the control section 100 uses the initial position P0 as the reference position of the terminal 20.

The control section 100 searches for the signals S1 and the like from the observable GPS satellites 12a and the like. Specifically, the satellite signal reception program 112 and the control section 100 exemplify a signal search section.

When the control section 100 has succeeded in searching for the signals S1 and the like, the control section 100 tracks the signals S1 and the like. In this specification, the expression "searches for the signals S1 and the like" is synonymously used with the expression "searches for the GPS satellites 12a and the like", and the expression "tracks the signals S1 and the like" is synonymously used with the expression "tracks the GPS satellites 12a and the like".

The control section 100 correlates a C/A code received by the terminal 20 with a C/A code replica generated by the terminal 20 in order to receive the signals S1 and the like.

Figure 4:
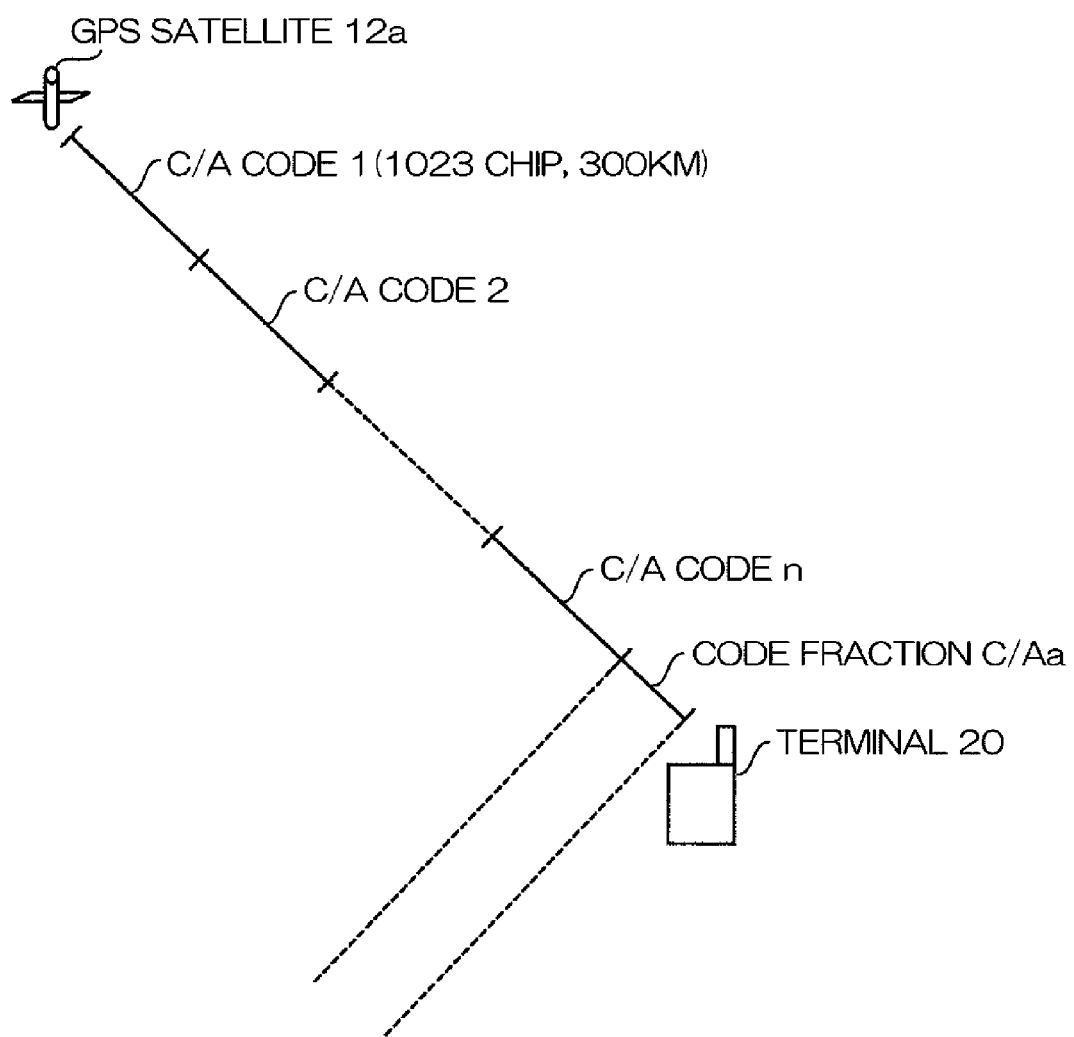
FIG. 4 is a view illustrative of a positioning method.

FIG. 4 is a schematic view showing an example of a positioning method.

FIG. 4 shows a positioning method using a code phase.

As shown in FIG. 4, it may be considered that the C/A codes continuously line up between the GPS satellite 12a and the terminal 20, for example. Since the distance between the GPS satellite 12a and the terminal 20 is not necessarily a multiple of the length (300 kilometers (km)) of the C/A code, a code fraction C/Aa may exist. Specifically, a portion of a multiple of the C/A code and a fraction portion may exist between the GPS satellite 12a and the terminal 20. The total length of the portion of a multiple of the C/A code and the fraction portion is the pseudo-range. The terminal 20 locates the position using the pseudo-ranges for three or more GPS satellites 12a and the like.

In this specification, the fraction portion C/Aa of the C/A code is called a code phase. The code phase may be indicated by the number of the chip included in the 1023 chips of the C/A code, or may be converted into distance, for example. When calculating the pseudo-range, the code phase is converted into distance.

The position of the GPS satellite 12a in the orbit can be calculated using the ephemeris. The ephemeris is information indicating the precise orbit of the GPS satellite 12a. The portion of a multiple of the C/A code can be specified by calculating the distance between the position of the GPS satellite 12a in the orbit and the initial position P0 described later, for example. Since the length of the C/A code is 300 kilometers (km), the position error of the initial position P0 must be 150 kilometers (km) or less.

The terminal 20 performs a correlation process while changing the code phase and the frequency. The correlation process includes a coherent process and an incoherent process described later.

The phase at which the maximum correlation cumulative value becomes maximum is the code fraction C/Aa.

FIGS. 5A and 5B and FIGS. 6A and 6B are views illustrative of the correlation process.

The correlation process includes the coherent process and the incoherent process.

Figure 5A:
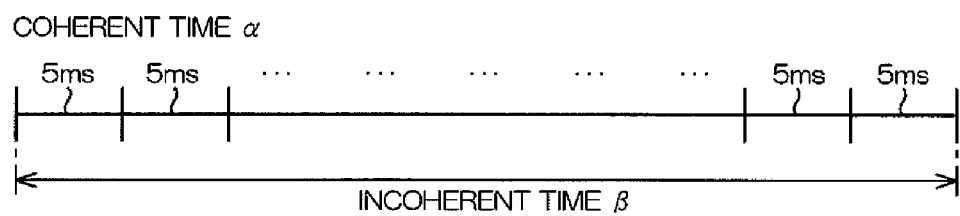
FIGS. 5A and 5B are views illustrative of a correlation process.

The coherent process is a process of correlating the C/A code received by the terminal 20 with the C/A code replica. For example, when the coherent time is 5 msec, as shown in FIG. 5A, the terminal 20 calculates the correlation value between the C/A code synchronously accumulated over 5 msec and the C/A code replica. The correlated phase (code phase) and the correlation value are output as a result of the coherent process.

The incoherent process is a process of calculating the correlation cumulative value (incoherent value) by accumulating the correlation values as the coherent results. The period of time in which the incoherent process is performed is called an accumulation time.

The code phase output by the coherent process and the correlation cumulative value are output as a result of the correlation process.

Figure 5B:
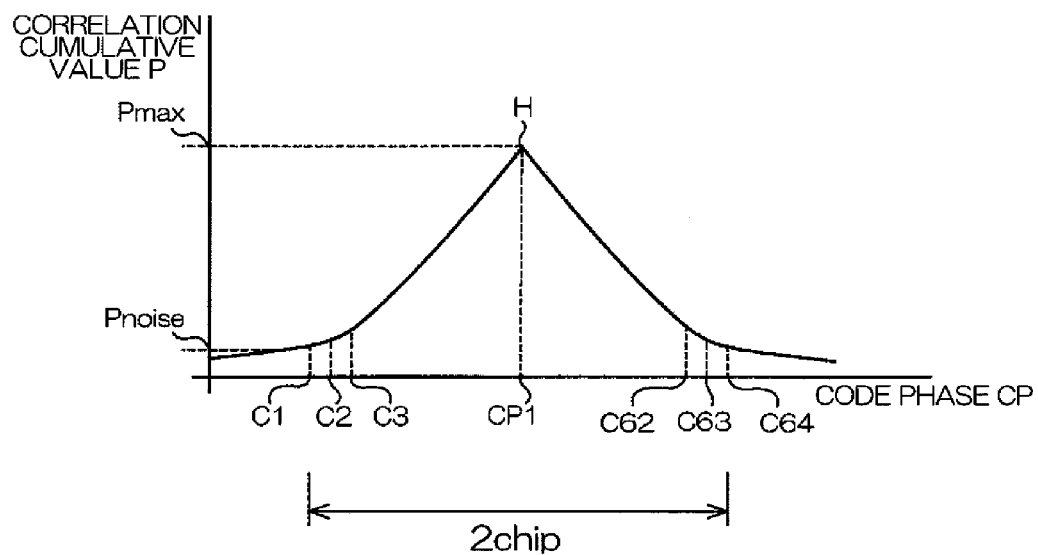

As shown in FIG. 5B, a code phase CP1 corresponding to the maximum value Pmax of the correlation cumulative value P is the code phase of the received C/A code. The terminal 20 calculates the pseudo-range using the code phase CP1.

Figure 6A:
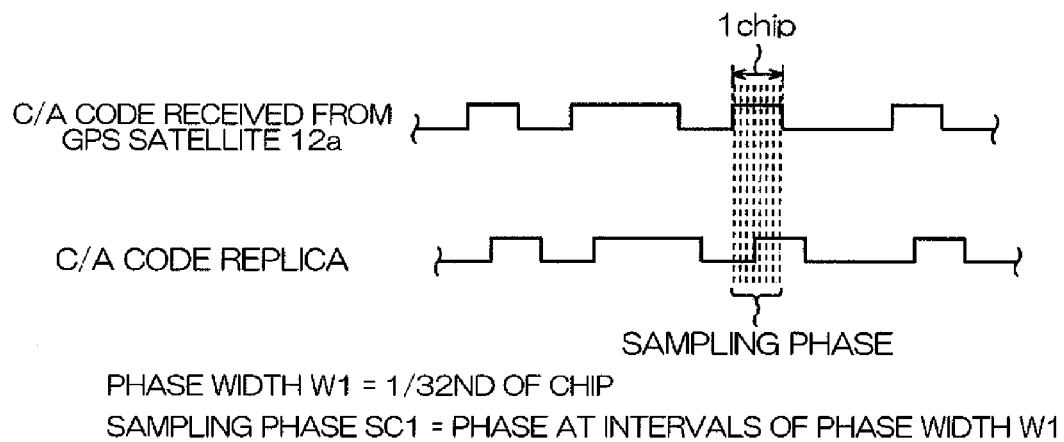
FIGS. 6A and 6B are further views illustrative of the correlation process.

As shown in FIG. 6A, the terminal 20 equally divides one chip of the C/A code and performs the correlation process, for example. One chip of the C/A code is equally divided into 32 sections, for example. Specifically, the terminal 20 performs the correlation process at intervals of a phase width of 1/32nd of the chip (phase width W1).

Figure 6B:
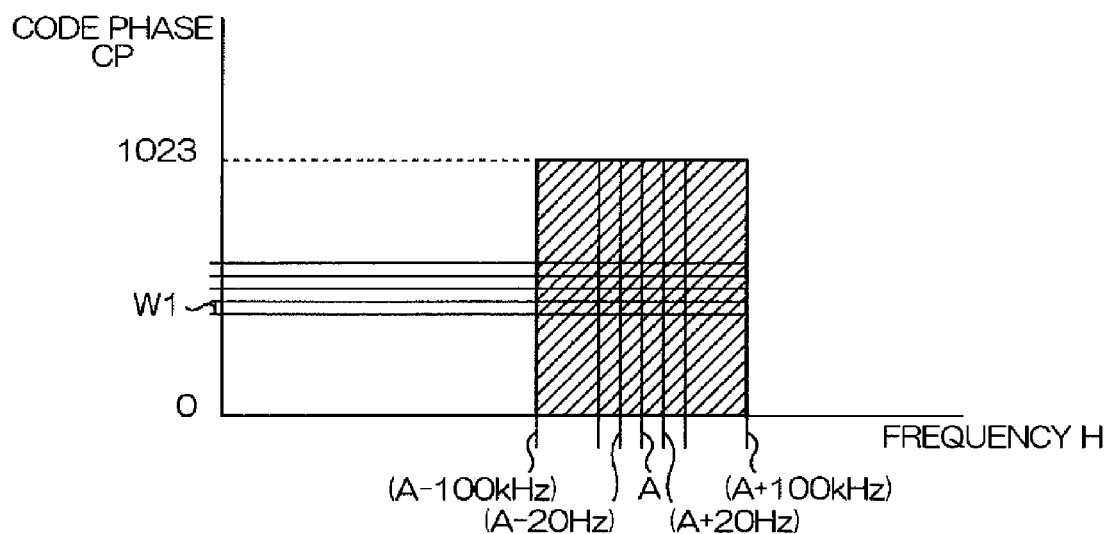

As shown in FIG. 6B, the terminal 20 searches for the first chip to the 1023rd chip of the C/A code, for example.

In this case, the terminal 20 searches for the signals S1 and the like around a search center frequency A over a frequency range with a specific width. For example, the terminal 20 searches for the signals S1 and the like at intervals of 20 Hz within the frequency range from (A−100) kHz to (A+100) kHz (hereinafter called "search range").

The search range exemplifies a predetermined frequency range. Frequencies at intervals of 20 Hz exemplify search frequencies at specific intervals.

The GPS receiver generally calculates the search center frequency A by adding a Doppler shift (estimated Doppler frequency) H2 to a transmission frequency H1 of the GPS satellites 12a and the like, and adding a drift DR to the resulting value. The transmission frequency H1 of the GPS satellites 12a and the like is known (e.g. 1575.42 MHz).

The Doppler shift occurs due to the relative movement of each of the GPS satellites 12a and the like and the GPS receiver. The GPS receiver calculates the radial velocity (velocity in the direction of the terminal 20) of each of the GPS satellites 12a and the like at the present time using the ephemeris. The GPS receiver calculates the estimated Doppler frequency H2 based on the radial velocity.

The GPS receiver calculates the search center frequency A in units of the GPS satellites 12a and the like.

As shown in FIG. 3, the satellite signal reception program 112 has a search mode M1, a search mode M2, and a search mode M3. Specifically, the control section 100 can receive the signals S1 and the like using the three search modes M1, M2, and M3.

Figures 7, 8:
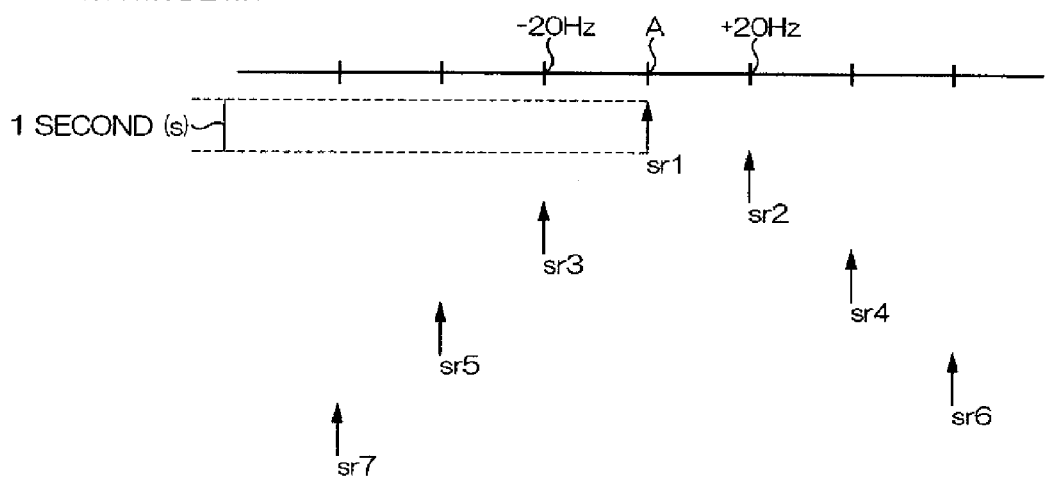

FIG. 7 is a view illustrative of the search modes M1 and the like.

FIG. 8 is a view illustrative of the search mode M1.

Figure 9:
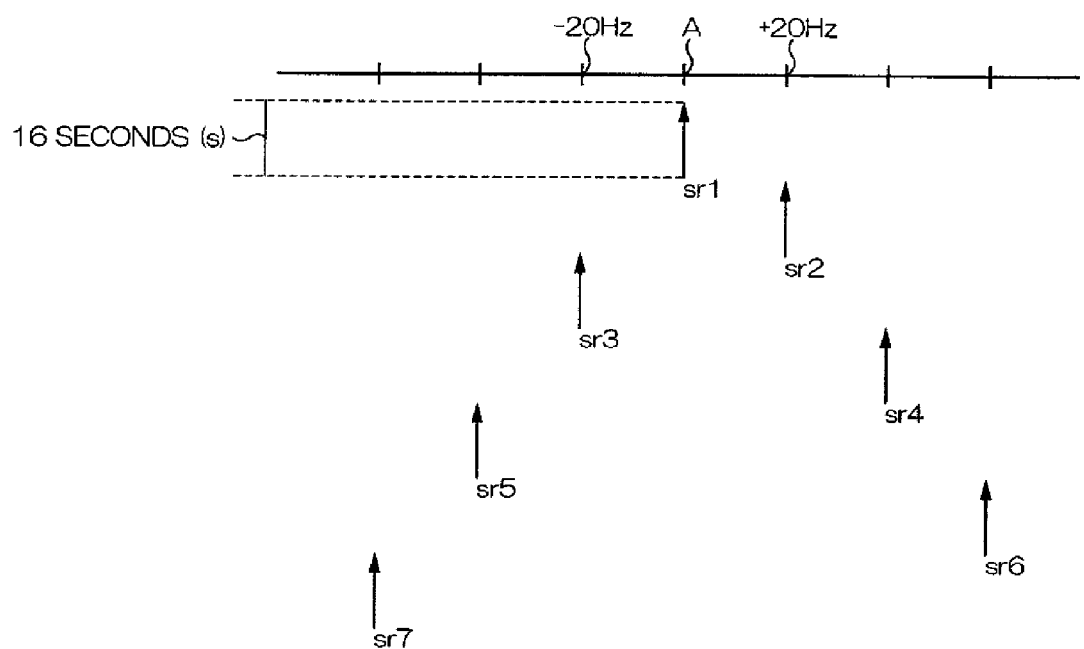
FIG. 9 is a view illustrative of the search mode M2.

FIG. 9 is a view illustrative of the search mode M2.

Figure 10:
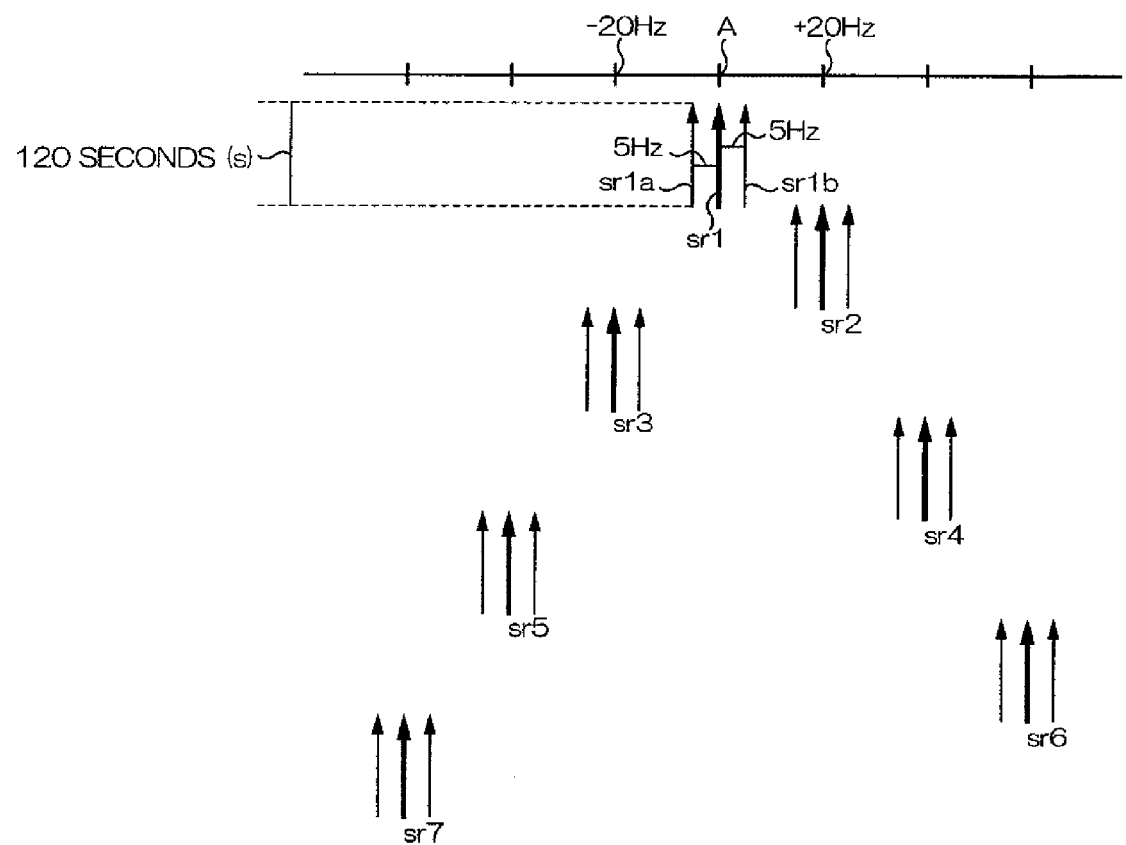
FIG. 10 is a view illustrative of the search mode M3.
Figure 11:
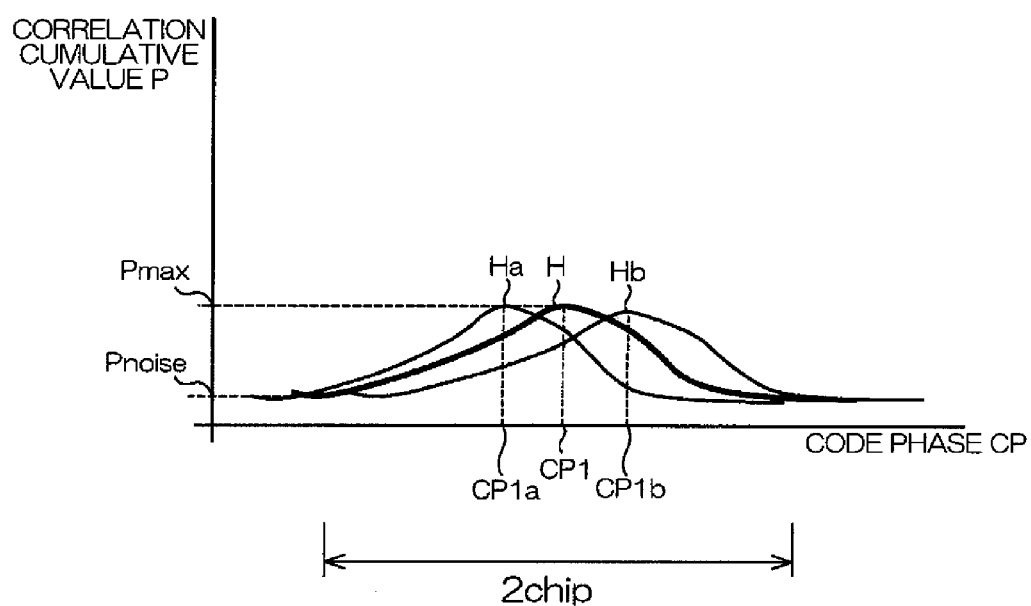
FIG. 11 is another view illustrative of the search mode M3.

FIGS. 10 and 11 are views illustrative of the search mode M3.

As shown in FIG. 7, the coherent time and the accumulation time in the search mode M1 are respectively 5 milliseconds (ms) and 1 second (s). The search mode M1 is suitable for a strong electric field of −150 dBm or more, for example.

As shown in FIG. 8, the terminal 20 performs the first search sr1 at the search center frequency A, for example. The accumulation time of the search sr1 is 1 second (s). The terminal 20 performs searches sr2 to sr7 around the search center frequency A at frequency intervals of 20 Hz to search for the signal within the search range. In each of the searches sr2 and the like, the terminal 20 searches for the signal while changing the phase (description thereof is omitted).

The searches Sr1 and the like performed at frequency intervals of 20 Hz are also called basic searches Sr1 and the like. The frequencies corresponding to the basic searches (i.e., A+20 Hz×n) are search frequencies.

As shown in FIG. 7, the coherent time and the accumulation time in the search mode M2 are respectively 5 milliseconds (ms) and 16 seconds (s). The search mode M2 is suitable for a weak electric field of −160 dBm or more and less than −150 dBm, for example.

As shown in FIG. 9, the terminal 20 performs the first search sr1 in the search mode M2 at the search center frequency A, for example. The accumulation time of the search sr1 is 16 seconds (s). The terminal 20 performs the searches sr2 to sr7 around the search center frequency A at frequency intervals of 20 Hz to search for the signal within the search range.

The search modes M1 and M2 exemplify a basic mode. An accumulation time of 1 second (s) in the search mode M1 and an accumulation time of 16 seconds (s) in the search mode M2 exemplify a first accumulation time.

As shown in FIG. 7, the coherent time and the accumulation time in the search mode M3 are respectively 5 milliseconds (ms) and 120 seconds (s). The search mode M3 is suitable for a very weak electric field of −166 dBm or more and less than −160 dBm, for example. The search mode M3 exemplifies a special mode. An accumulation time of 120 seconds (s) in the search mode M3 exemplifies a second accumulation time.

The accumulation time (120 seconds (s)) in the search mode M3 is specified in advance as an accumulation time longer than the accumulation time in the search mode M1 and the accumulation time in the search mode M2.

As shown in FIG. 10, the terminal 20 performs the first search sr1 in the search mode M3 at the search center frequency A, for example. The accumulation time of the search sr1 is 120 seconds (s).

The terminal 20 performs subsidiary searches sr1a and sr1b in parallel with the search sr1.

The frequencies at which the subsidiary searches sr1a and the like are performed (hereinafter called "subsidiary frequencies") differ from the search center frequency A by 5 Hz, for example. The frequency of the subsidiary search sr1a is lower than the search center frequency A by 5 Hz. The frequency of the subsidiary search sr1b is higher than the search center frequency A by 5 Hz.

The subsidiary frequencies are specified at intervals narrower than the frequency intervals of the basic searches sr1, sr2, and the like. The subsidiary frequency is specified based on the drift of the reference oscillator within the accumulation time in the search mode M3. In more detail, the drift which occurs within 120 seconds (s) (i.e., the accumulation time in the search mode M3) can be measured in advance, and the maximum value of the drift is 5 Hz, for example. The range specified by the maximum value of the drift, i.e., the range of +5 Hz around the search center frequency is called a drift range.

The intervals of the subsidiary frequencies are specified to be equal to or greater than the maximum value of the drift. Specifically, the frequency intervals of the subsidiary frequencies are equal to or greater than the maximum value of the drift and less than the frequency intervals of the basic searches sr1, sr2, and the like.

The control section 100 also performs subsidiary searches sr2a and sr2b in parallel with the basic search sr2. Likewise, the control section 100 performs subsidiary searches in parallel with the basic searches sr3 to sr7.

As shown in FIG. 11, the maximum correlation cumulative value Pmax obtained by the basic search sr1 is H, for example. The code phase with a maximum correlation cumulative value Pmax of H is CP1. The maximum correlation cumulative value Pmax obtained by the subsidiary search sr1a is Ha, and the code phase with a maximum correlation cumulative value Pmax of Ha is CP1a. The maximum correlation cumulative value Pmax obtained by the subsidiary search sr1b is Hb, and the code phase with a maximum correlation cumulative value Pmax of Hb is CP1b.

The control section 100 sums up the maximum correlation cumulative value Pmax obtained by the basic search sr1 and the maximum correlation cumulative values Pmax obtained by the subsidiary searches sr1a and sr1b. Specifically, the correlation value Pmax1f obtained by the first search (basic search sr1 and subsidiary searches sr1a and sr1b) is Pmax1f=H+Ha+Hb, as indicated by the expression 2. This allows the signals S1 and the like to be distinguished from noise.

The average value of the code phases determined by the basic search sr1 and the subsidiary searches sr1a and sr1b is used as the code phase. Specifically, the code phase CP1f determined by the first search (basic search sr1 and subsidiary searches sr1a and sr1b) is CP1f=(CP1+CP1a+CP1b)/3, as indicated by the expression 3.

The control section 100 enters the search mode M2 when the signals S1 and the like cannot be received in the search mode M1, and enters the search mode M3 when the signals S1 and the like cannot be received in the search mode M2. The control section 100 selects the search mode M1 or the like in units of the GPS satellites 12a and the like.

The control section 100 stores information indicating the actual drift upon expiration of the accumulation time in each of the search modes M1 to M3, and uses the information when calculating the center frequency A during the subsequent correlation process. A specific method is the same as that disclosed in JP-A-5-256926, for example.

When the control section 100 has received the signals S1 and the like, the control section 100 calculates the code phase of the C/A code in units of the OPS satellites 12a and the like, generates measurement information 156 indicating the code phase, and stores the measurement information 156 in the second storage section 150.

The basic searches sr1 and the like in each of the search modes M1 to M3 may be performed at the same time, differing from this embodiment.

The subsidiary searches sr1a and the like in the search mode M3 need not be performed at two frequencies lower and higher than the center frequency A, differing from this embodiment. For example, a number of subsidiary searches sr1a and the like may be performed within the drift range. In the example shown in FIG. 10, three subsidiary searches may be provided between the subsidiary search sr1a and the basic search sr1a at frequency intervals of 1 Hz, and three subsidiary searches may be provided between the subsidiary search sr1b and the basic search sr1b at frequency intervals of 1 Hz. The signals S1 and the like can be more efficiently received by increasing the number of subsidiary searches. Specifically, the signals S1 and the like can be more efficiently received as the number of subsidiary searches increases insofar as frequencies within a range equal to or less than the frequency range of the basic search and equal to or greater than the drift range can be covered by the subsidiary searches.

As shown in FIG. 3, the terminal 20 stores a positioning program 114 in the first storage section 110. The positioning program 114 is a program for causing the control section 100 to calculate a located position P1 using the code phases calculated for four or more GPS satellites 12a and the like.

The control section 100 stores located position information 158 indicating the located position P1 in the second storage section 150.

As shown in FIG. 3, the terminal 20 stores a located position output program 116 in the first storage section 110. The located position output program 116 is a program for causing the control section 100 to display the located position information 158 on the display device 34 (see FIG. 2).

The terminal 20 is configured as described above.

The terminal 20 can search for the signals S1 and the like in the search mode M3. Since the accumulation time in the search mode M3 is longer than the accumulation times in the search modes M1 and M2, the search mode M3 is suitable for a weak electric field.

In the search mode M3, the terminal 20 searches for the signals S1 and the like at the subsidiary frequencies in addition to the basic frequency. The subsidiary frequency is specified based on the drift of the reference oscillator of the terminal 20 within the accumulation time in the search mode M3.

Specifically, the frequency for searching for the signals S1 and the like in the search mode M3 is specified taking the drift into consideration. In other words, even if the drift occurs in the terminal 20, appropriate correlation results (accumulation results) can be obtained at the basic frequency and the subsidiary frequencies.

In the search mode M3, the terminal 20 sums up the accumulation results of the basic search and the subsidiary search. Therefore, the terminal 20 can distinguish the signals S1 and the like from noise even under a weak electric field.

This enables synchronization with the satellite signal, even if the actual reception frequency differs from the search frequency, under a weak electric field which requires an increased accumulation time.

According to this embodiment, even if the actual reception frequency differs from the center frequency A (see FIG. 10) in the first search, if the difference between the actual reception frequency and the center frequency A is 5 Hz or less, appropriate correlation results can be obtained by the basic search and the subsidiary search, whereby synchronization can be promptly achieved.

This embodiment is particularly effective under a very weak electric field of −160 dBm or less which requires an increased accumulation time, for example.

Operation Example and the Like of Terminal 20 According to this Embodiment

The terminal 20 is configured as described above. An operation example of the terminal 20 is described below.

Figure 12:
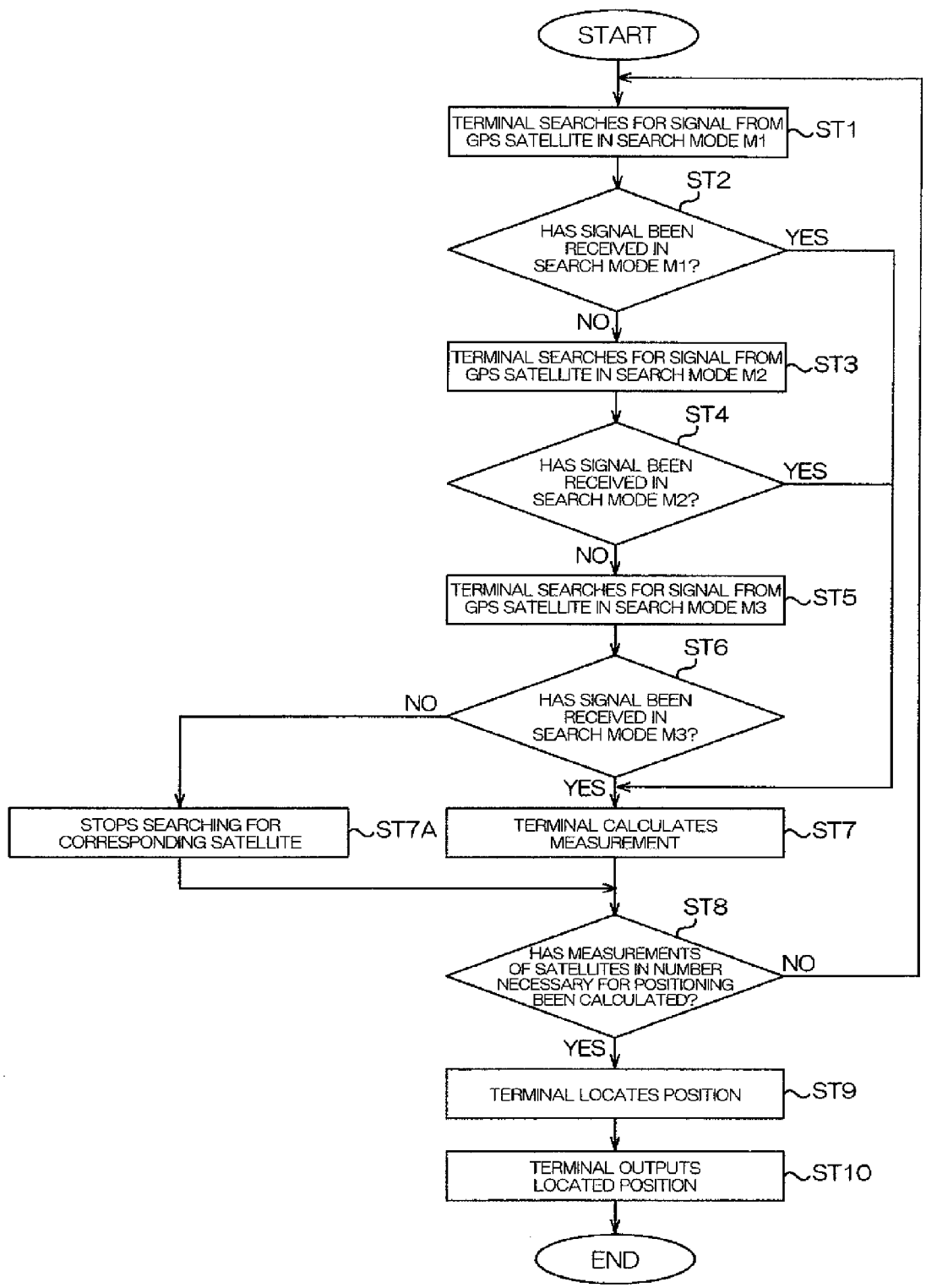
FIG. 12 is a schematic flowchart showing an operation example of the terminal.

FIG. 12 is a schematic flowchart showing an operation example of the terminal 20.

The terminal 20 starts receiving (searching for) the signals S1 and the like in the search mode M1 (step ST1 in FIG. 12).

The terminal 20 determines whether or not the signals S1 and the like have been received in the search mode M1 (step ST2).

When the terminal 20 has determined that the signals S1 and the like have been received in the search mode Mt, the terminal 20 proceeds to a step ST7.

When the terminal 20 has determined that the signals S1 and the like cannot be received in the search mode M1, the terminal 20 starts receiving (searching for) the signals S1 and the like in the search mode M2 (step ST3).

The terminal 20 determines whether or not the signals S1 and the like have been received in the search mode M2 (step ST4).

When the terminal 20 has determined that the signals S1 and the like have been received in the search mode M2, the terminal 20 proceeds to the step ST7.

When the terminal 20 has determined that the signals S1 and the like cannot be received in the search mode M2, the terminal 20 starts receiving (searching for) the signals S1 and the like in the search mode M3 (step ST5).

The terminal 20 determines whether or not the signals S1 and the like have been received in the search mode M3 (step ST6).

When the terminal 20 has determined that the signals S1 and the like cannot be received in the search mode M3, the terminal 20 stops searching for the corresponding satellite (step ST7A).

When the terminal 20 has determined that the signals S1 and the like have been received in the search mode M3, the terminal 20 calculates the measurement (code phase of the C/A code) (step ST7).

The terminal 20 performs the above steps ST1 to ST7 in units of the observable GPS satellites 12a and the like.

The terminal 20 determines whether or not the measurements of the satellites in a number necessary for positioning have been calculated (step ST8). When the terminal 20 has determined that the measurements of the satellites in a number necessary for positioning have been calculated, the terminal 20 locates the position (step ST9), and outputs the located position P1 (step ST10).

When the terminal 20 has determined that the measurements of the satellites in a number necessary for positioning have not been calculated, the terminal 20 returns to the step ST1.

The above steps enable synchronization with the satellite signal, even if the actual reception frequency differs from the search frequency, under a weak electric field which requires an increased accumulation time.

(Program, Computer-Readable Recording Medium, and the Like)

A program for controlling a terminal device may be provided which causes a computer to execute the basic search, the special search, and the like of the above-described operation example.

A computer-readable recording medium having such a program for controlling a terminal device recorded thereon and the like may also be provided.

A program storage medium used to install the program for controlling a terminal device and the like in a computer to allow the program and the like to be executable by the computer may be implemented by a package medium such as a flexible disc such as a floppy disc®, a compact disc read only memory (CD-ROM), a compact disc-recordable (CD-R), a compact disc-rewritable (CD-RW), or a digital versatile disk (DVD), a semiconductor memory, a magnetic disk, or a magnetooptical disk in which the program is stored temporarily or permanently, or the like.

The invention is not limited to the above embodiments. Moreover, the above embodiments may be configured in combination.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A terminal device which locates a position using a satellite signal from a satellite positioning system (SPS) satellite, the terminal device comprising:

a signal search section which can search for the satellite signal in a basic mode, in which the signal search section searches for the satellite signal by performing a correlation process over a predetermined first accumulation time within a predetermined frequency range in units of search frequencies at specific intervals, and a special mode, in which the signal search section searches for the satellite signal by performing the correlation process over a predetermined second accumulation time longer than the first accumulation time, the signal search section searching for the satellite signal in the special mode at the search frequency and frequencies differing from the search frequency by a specific frequency which is less than the interval of the search frequencies and specified based on a drift of a reference oscillator of the terminal device within the second accumulation time, and determining a search result in the special mode based on search results at the search frequency and the frequencies differing from the search frequency by the specific frequency.

2. The terminal device as defined in claim 1, wherein, in the special mode, the signal search section searches for the satellite signal at a frequency higher than the search frequency by the specific frequency and a frequency lower than the search frequency by the specific frequency as the frequencies differing from the search frequency by the specific frequency.

3. The terminal device as defined in claim 1, wherein the specific frequency is specified based on a maximum value of the drift of the reference oscillator within the second accumulation time.

4. A method of controlling a terminal device which locates a position using a satellite signal from a satellite positioning system (SPS) satellite, the method comprising:

searching for the satellite signal by performing a correlation process over a predetermined first accumulation time within a predetermined frequency range in units of search frequencies at specific intervals;

searching for the satellite signal, when the search for the satellite signal has failed, by performing the correlation process over a predetermined second accumulation time longer than the first accumulation time at the search frequency and frequencies differing from the search frequency by a specific frequency which is less than the interval of the search frequencies and specified based on a drift of a reference oscillator of the terminal device within the second accumulation time; and determining a search result of the satellite signal based on a search result at the search frequency and search results at the frequencies differing from the search frequency by the specific frequency.

5. A computer-readable recording medium storing a program for causing a computer provided in a terminal device, which locates a position using a satellite signal from a satellite positioning system (SPS) satellite, to execute:

a process of searching for the satellite signal by performing a correlation process over a predetermined first accumulation time within a predetermined frequency range in units of search frequencies at specific intervals;

a process of searching for the satellite signal, when the search for the satellite signal has failed, by performing the correlation process over a predetermined second accumulation time longer than the first accumulation time at the search frequency and frequencies differing from the search frequency by a specific frequency which is less than the interval of the search frequencies and specified based on a drift of a reference oscillator of the terminal device within the second accumulation time; and a process of determining a search result of the satellite signal based on a search result at the search frequency and search results at the frequencies differing from the search frequency by the specific frequency.

* * * * *